United States Patent
Yoshida

(10) Patent No.: US 10,530,988 B2
(45) Date of Patent: Jan. 7, 2020

(54) ELECTRONIC APPARATUS AND CONTROL METHOD THEREOF

(71) Applicant: CANON KABUSHIKI KAISHA, Tokyo (JP)

(72) Inventor: Koji Yoshida, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/377,903

(22) Filed: Dec. 13, 2016

(65) Prior Publication Data

US 2017/0180633 A1 Jun. 22, 2017

(30) Foreign Application Priority Data

Dec. 16, 2015 (JP) ................................. 2015-245587

(51) Int. Cl.
*H04N 5/232* (2006.01)
*G06F 3/0488* (2013.01)
*G06F 3/0481* (2013.01)
*G06F 3/0482* (2013.01)

(52) U.S. Cl.
CPC ..... *H04N 5/23216* (2013.01); *G06F 3/04886* (2013.01); *H04N 5/23245* (2013.01); *H04N 5/23293* (2013.01); *G06F 3/0482* (2013.01); *G06F 3/0488* (2013.01); *G06F 3/04817* (2013.01)

(58) Field of Classification Search
CPC .......... H04N 5/23216; H04N 5/23293; H04N 5/23245; G06F 3/04886; G06F 3/04817; G06F 3/0488; G06F 3/0482
See application file for complete search history.

(56) References Cited

U.S. PATENT DOCUMENTS

| | | | | |
|---|---|---|---|---|
| 2009/0322774 | A1* | 12/2009 | Hosoi | G09G 5/363 345/581 |
| 2010/0166404 | A1* | 7/2010 | Lombardi | G03B 17/00 396/89 |
| 2016/0360116 | A1* | 12/2016 | Penha | G06F 3/0487 |

FOREIGN PATENT DOCUMENTS

| | | |
|---|---|---|
| JP | 2004-212857 A | 7/2004 |
| JP | 2013-17088 A | 1/2013 |

* cited by examiner

*Primary Examiner* — Mekonnen D Dagnew
(74) *Attorney, Agent, or Firm* — Canon USA, Inc., IP Division

(57) ABSTRACT

An electronic apparatus includes a touch detection unit, a switching unit performing switching between a first state where a touch operation for a specific item is accepted and a second state where a touch operation for the specific item is not accepted, a display control unit displaying the specific item in both the first state and the second state, and a control unit performing a specific process in response to a touch operation for a predetermined region not corresponding to the specific item and performing the process of the specific item in response to the touch operation for the specific item in the first state, and performing the specific process in response to a touch operation for the predetermined region and not performing the process of the specific item but performing the specific process even when there is a touch operation for the specific item in the second state.

25 Claims, 11 Drawing Sheets

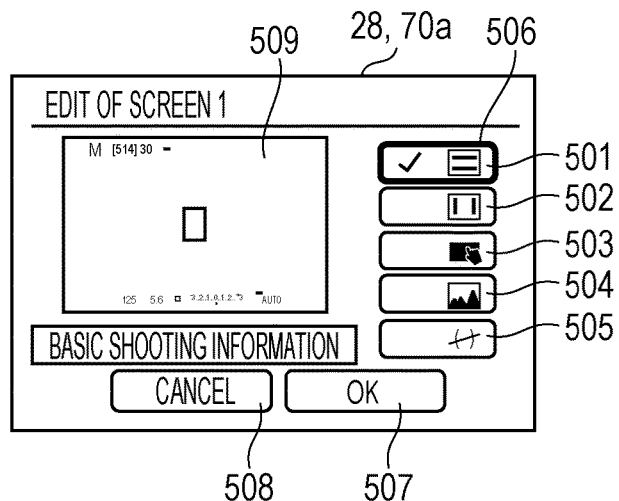
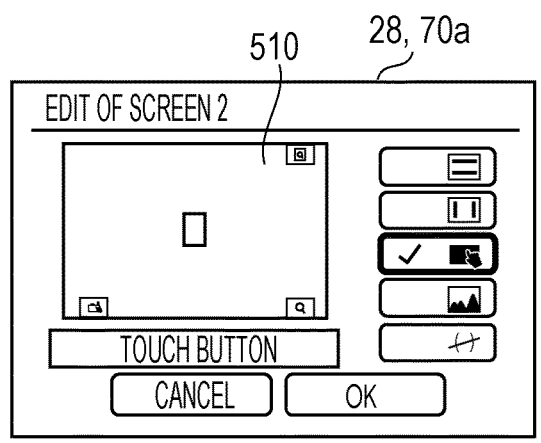
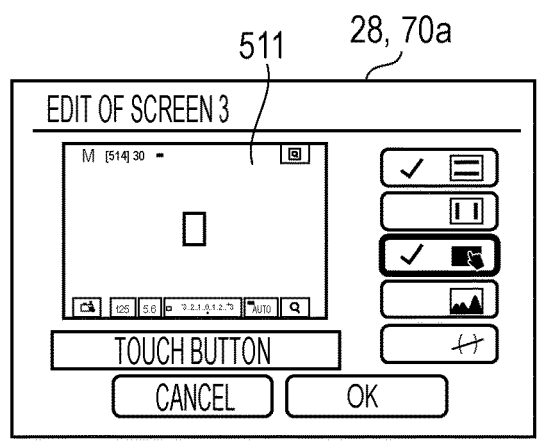
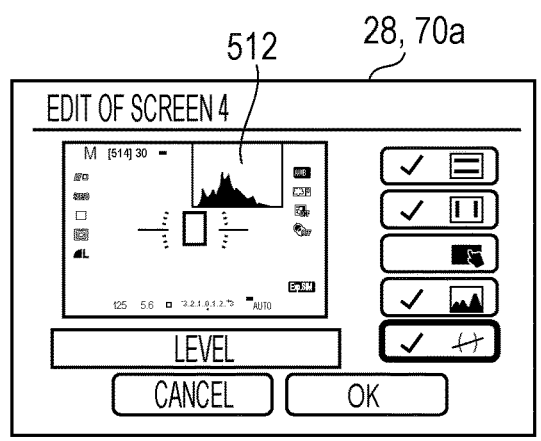

ELECTRONIC APPARATUS AND CONTROL METHOD THEREOF

BACKGROUND

Field

The present disclosure relates to an electronic apparatus and a control method thereof, and particularly relates to a technique for displaying an item on a display unit enabling a touch operation.

Description of the Related Art

In a case of specifying a position where a specific process is performed or selecting a display object such as an icon, a region where touch for specifying the position is accepted and a region where touch for selecting the icon is accepted can be separately provided. Japanese Patent Laid-Open No. 2013-17088 discloses that a touch region where touch shutter is accepted and an icon display region are separately provided, and that when the touch region is touched, a touch icon is hidden so as not to accept touch in order to prevent the touch icon from being erroneously touched. In addition, on a touch panel (screen) of a digital camera, a smartphone, or the like, on which a touchable range is limited, an icon can be displayed or hidden. Japanese Patent Laid-Open No. 2004-212857 discloses that when a command for turning ON overwrite display is issued, an operation video screen with an operation button for accepting a touch operation is superimposed on a DVD menu screen, and that when a command for turning OFF overwrite display is issued, the operation video screen is hidden and a touch operation for the operation button cannot be performed.

On a touch panel of a limited size, even if a touch region and an icon display region are separately provided in the same manner as in Japanese Patent Laid-Open No. 2013-17088, in a case where an icon is erroneously touched before the touch region is touched, there is a possibility that the function of the icon will be executed. Therefore, it is considered that the icon in Japanese Patent Laid-Open No. 2013-17088 is configured as described in Japanese Patent Laid-Open No. 2004-212857 so that an operation button (operation video screen) for which a touch operation is possible is displayed or hidden in a switchable manner. When a user selects non-display of the operation display screen and disabling a touch operation for the operation button, there is no possibility that the user will erroneously touch the operation button and a process not intended by the user will be performed. However, the user cannot confirm display content of the operation button. When the operation video screen is displayed in order for the user to perform another operation by touching, while confirming the display content of the operation button, the user can confirm the display content of the operation button. However, there is a possibility that the user will erroneously touch the operation button and the unintended process will be performed.

SUMMARY

In view of the foregoing, embodiments provide an electronic apparatus reducing the likelihood that an operation not intended by a user will be performed when the user performs a touch operation while enabling the user to confirm information display content.

An electronic apparatus includes a touch detection unit configured to detect a touch operation on a display unit, a switching unit configured to switch a state to one of a plurality of states including a first state where a touch operation for a specific display item is accepted and a second state where a touch operation for the specific display item is not accepted, a display control unit configured to display the specific display item on the display unit in both the first state and the second state, and a control unit configured, in the first state in response to accepting a touch operation for a predetermined region not corresponding to the specific display item, to perform a specific process corresponding to a position where the touch operation is performed, and in response to accepting a touch operation for the specific display item, to perform a process corresponding to the specific display item, and configured, in the second state in response to accepting a touch operation for the predetermined region, to perform the specific process corresponding to the position where the touch operation is accepted, and even when there is a touch operation for the specific display item, to perform the specific process corresponding to the position where the touch operation and not perform the process corresponding to the specific display item.

An electronic apparatus includes a touch detection unit configured to detect a touch operation on a display unit, a switching unit configured to switch a state to one of a plurality of states including a first state where a touch operation for a specific display item indicating a set value of a specific item is accepted and a second state where a touch operation for the specific display item is not accepted, a display control unit configured to display the specific display item on the display unit in both the first state and the second state, a changing unit configured to change the set value of the specific display item, and a control unit configured to change a display form of the specific display item in response to a change in the set value of the specific display item, configured, in the first state in response to accepting a touch operation for a predetermined region not corresponding to the specific display item, to perform a specific process corresponding to a position where the touch operation is performed, and in response to accepting a touch operation for the specific display item, to perform a process corresponding to the specific display item, and configured, in the second state in response to accepting a touch operation for the predetermined region, to perform the specific process corresponding to a position where the touch operation is accepted, and even when there is a touch operation for the specific display item, not to perform the process corresponding to the specific display item.

An electronic apparatus includes a touch detection unit configured to detect a touch operation for a display unit, a switching unit configured to switch a state to one of a plurality of states including a first state where a touch operation for a specific display item is accepted and a second state where a touch operation for the specific display item is not accepted, a display control unit configured to display the specific display item on the display unit in both the first state and the second state, and a control unit configured, in the first state in response to accepting a touch operation for a predetermined region not corresponding to the specific display item, to perform a specific process corresponding to a position where the touch operation is performed, and in response to accepting a touch operation for the specific display item, to perform a process corresponding to the specific display item, and configured, in the second state in response to accepting a touch operation for the predetermined region, to perform the specific process corresponding to the position where the touch operation is accepted, and even when there is a touch operation for the specific display item, not to perform the process corresponding to the specific display item, wherein the control unit in the first state displays, on the display unit, a touch button that accepts a touch operation, the touch button being different from the specific display item and does not display the touch button in the second state.

Further features will become apparent from the following description of exemplary embodiments with reference to the attached drawings.

BRIEF DESCRIPTION OF THE DRAWINGS

FIGS. 5A to 5D are examples of edit screens in respective patterns.

DESCRIPTION OF THE EMBODIMENTS

An exemplary embodiment will be described in detail below with reference to the accompanying drawings.

It is to be noted that the following exemplary embodiment is merely one example and can be appropriately modified or changed depending on individual constructions and various conditions of apparatuses. Thus, the exemplary embodiment is not seen to be limiting.

Figure 1A:
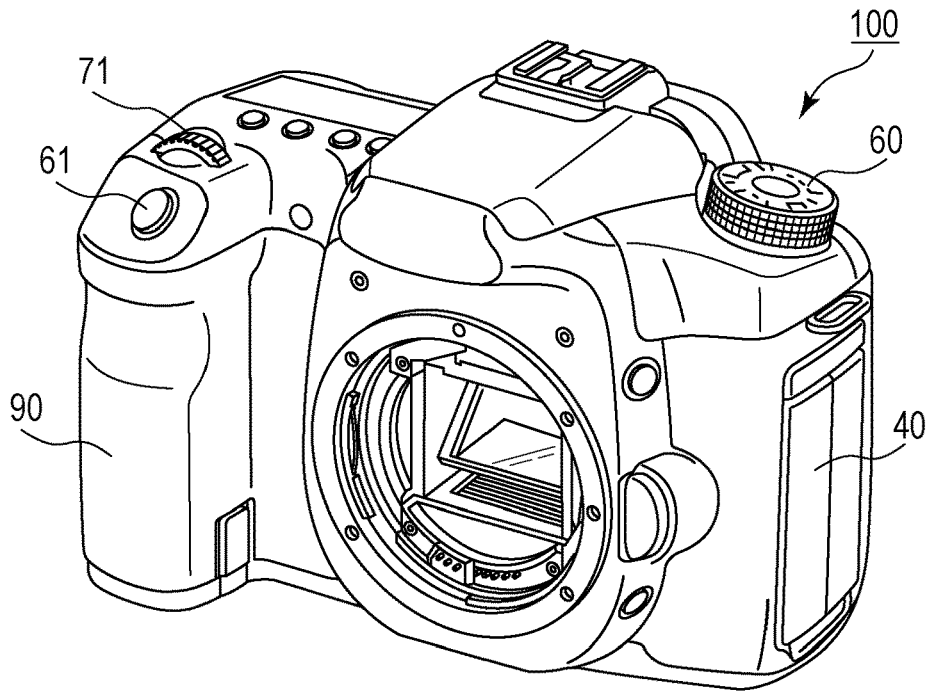
FIGS. 1A and 1B are external views of a digital camera as an example of a device to which the configuration of the present exemplary embodiment can be applied.
Figure 1B:
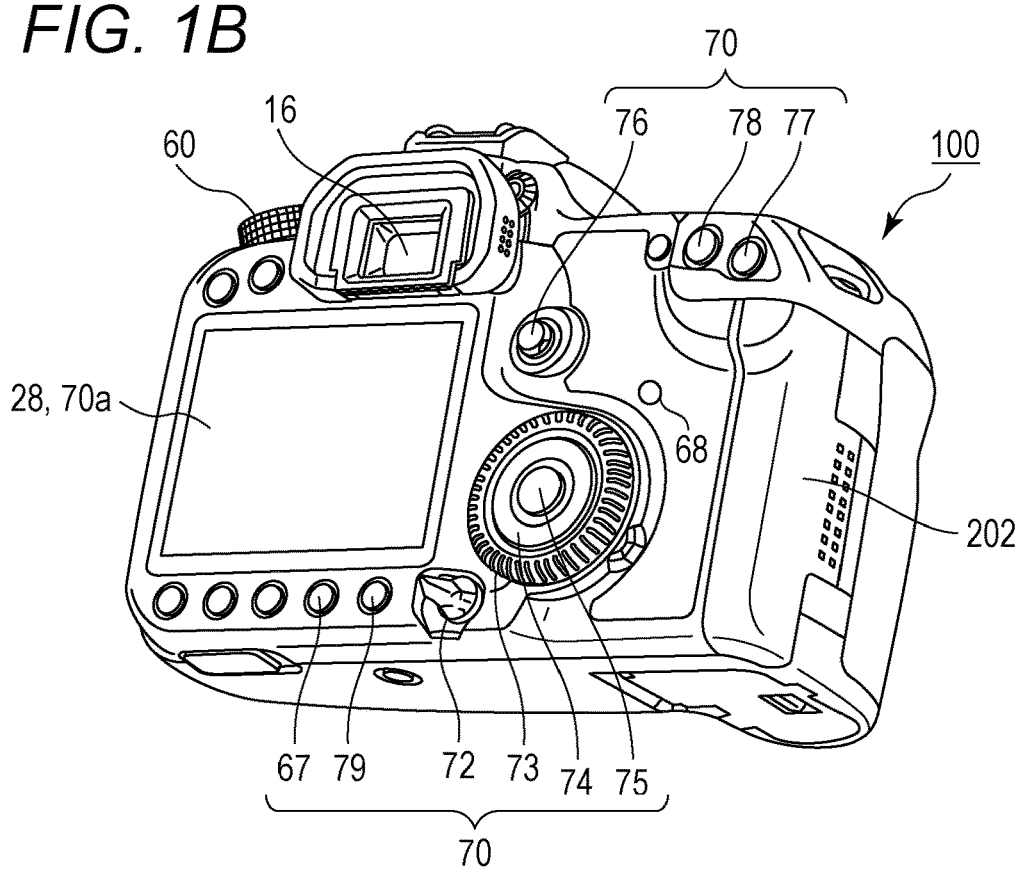

FIGS. 1A and 1B illustrate external views of a digital camera as an example of an imaging device of the present exemplary embodiment. FIG. 1A is a front perspective view of a digital camera 100, and FIG. 1B is a back perspective view of the digital camera 100. In FIG. 1B, a display unit 28 is a display unit displaying an image or various types of information. A shutter button 61 is an operation unit for providing a shooting instruction. A mode selection switch 60 is an operation unit for switching the mode among various modes. A terminal cover 40 is a cover protecting a connector (not illustrated) for connecting a connection cable with an external apparatus and the digital camera 100.

A main electronic dial 71 is a rotating operation member included in an operation unit 70. Set values of shutter speed, an aperture, and the like can be changed by rotating the main electronic dial 71. A power switch 72 is an operation member for turning ON and OFF the digital camera 100. A sub electronic dial 73 is a rotating operation member included in the operation unit 70. The sub electronic dial 73 can move a selection frame, perform image feeding, etc.

An info button 68 is a button (single operation member) for switching information display displayed on the display unit 28 such that four patterns (combinations, sets) at maximum are displayed one after another. For example, when the info button 68 is pressed down while pattern 1 is displayed, display is switched to pattern 2. The combination of pieces of information to be displayed can be set for each pattern, and a user can switch the information display to preferred information display according to the shooting situation. Since it is possible to set which pattern will be displayed or hidden from among the four patterns, the information display can, for example, also be switched among two or three patterns.

A cross key 74 is included in the operation unit 70, and is a cross key (four-way key) whose upper, lower, right, and left portions can be pressed. The operation corresponding to the pressed portion of the cross key 74 can be performed. A SET button 75 included in the operation unit 70 is a push button, and is mainly used for determining the selected item.

An LV button 76 is included in the operation unit 70, and is a button for switching live view (hereinafter LV) between ON and OFF on the display unit 28. In a moving image shooting mode, the LV button 76 is used for instructing start and stop of movie shooting (recording). An enlargement button 77 is included in the operation unit 70, and is an operation button for turning ON and OFF an enlargement mode in live view display in a shooting mode and changing the enlargement ratio in the enlargement mode. In a play mode, the enlargement button 77 functions as an enlargement button for enlarging a play image and increasing the enlargement ratio. A reduction button 78 is included in the operation unit 70, and is a button for reducing the enlargement ratio of the enlarged play image and reducing the displayed image. A play button 79 is included in the operation unit 70, and is an operation button for switching the mode between the shooting mode and the play mode. When the play button 79 is pressed down during the shooting mode, the mode transitions to the play mode, and the latest image from among the images recorded in a recording medium 200 can be displayed on the display unit 28.

An eyepiece finder 16 is a look-in type finder for confirming a focus and composition of an optical image of an object obtained through a lens unit 150, which is described below. A lid 202 is a lid of a slot in which the recording medium 200 is stored. A grip portion 90 is a holding portion with a shape enabling a user to easily grip it with the user's hand when the user holds the digital camera 100.

Figure 2:
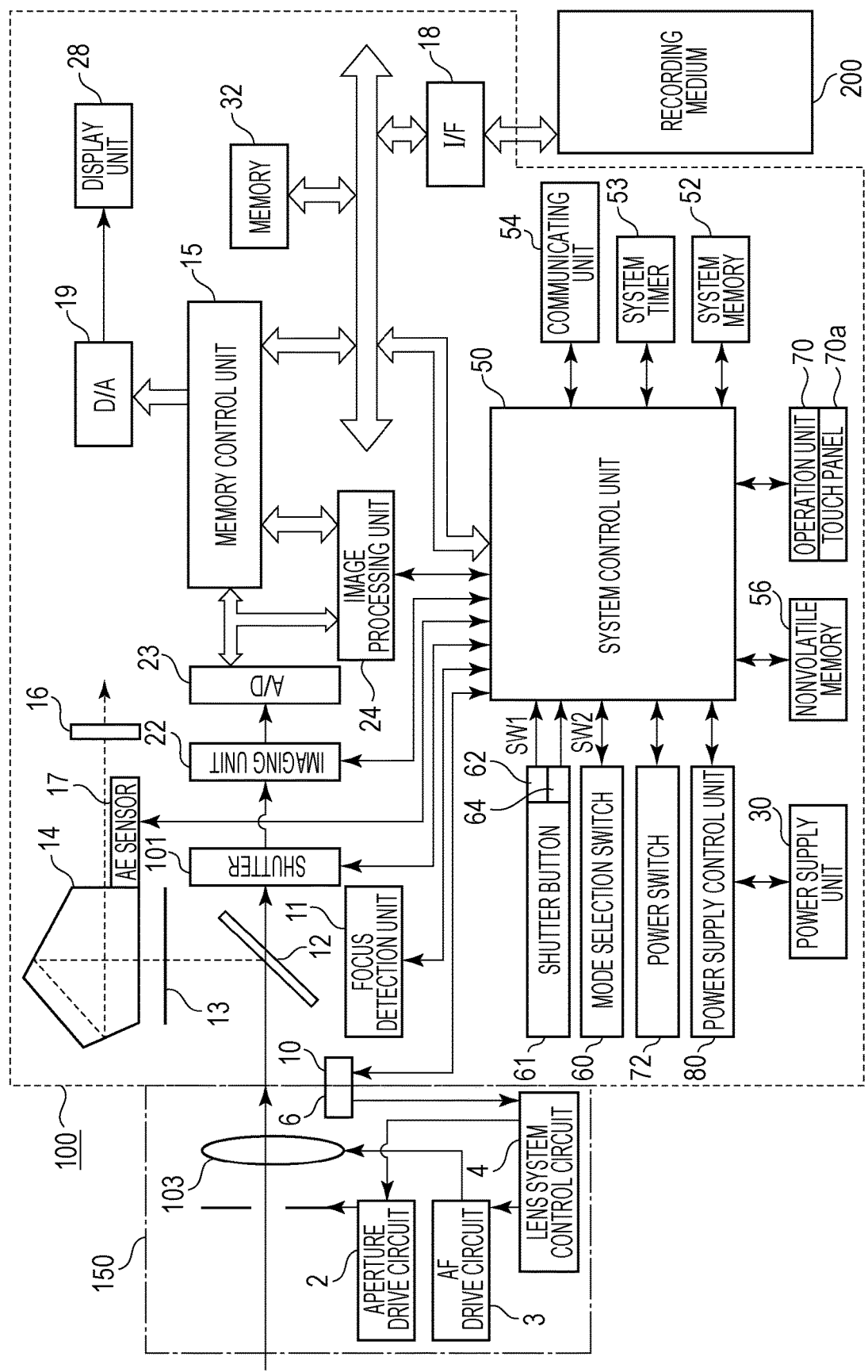
FIG. 2 is a block diagram illustrating a configuration example of the digital camera as an example of the device to which the configuration of the present exemplary embodiment can be applied.

FIG. 2 is a block diagram illustrating a configuration example of the digital camera 100 according to the present exemplary embodiment.

In FIG. 2, a lens unit 150 is a lens unit equipped with an exchangeable shooting lens.

A lens 103 typically includes a plurality of lenses. However, for description purposes, only one lens is illustrated. A communication terminal 6 is a communication terminal for the lens unit 150 to communicate with the digital camera 100. A communication terminal 10 is a communication terminal for the digital camera 100 to communicate with the lens unit 150. The lens unit 150 communicates with a system control unit 50 via the communication terminals 6 and 10, controls an aperture 102 via an aperture drive circuit 2 by means of an internal lens system control circuit 4, and focuses the lens 103 by shifting the position of the lens 103 via an AF drive circuit 3.

An auto exposure (AE) sensor 17 measures the luminance of the object imaged on a focusing screen 13 via the lens unit 150 and a quick-return mirror 12.

A focus detection unit 11 (autofocus (AF) sensor) is a phase-difference detection AF sensor capturing an image entering via the quick-return mirror 12 and outputting defocus amount information to the system control unit 50. The system control unit 50 controls the lens unit 150 according to the defocus amount information, and performs phase difference AF.

Upon exposure, live view shooting, and movie shooting, the quick-return mirror 12 (hereinafter referred to as mirror 12) is lifted up and down by an actuator (not illustrated)

according to an instruction from the system control unit 50. The mirror 12 directs light flux entering through the lens 103 to the finder 16 side or the imaging unit 22 side in a switchable manner. The mirror 12 is typically arranged to reflect light flux such that the light flux is guided to the finder 16. However, in the case of shooting or live view display, the mirror 12 is flipped up and escapes from the light flux (mirror up) such that the light flux is guided to the imaging unit 22. In addition, the mirror 12 is a half mirror where its center portion can transmit part of light, and transmits part of the light flux such that the part of the light flux enters the focus detection unit 11 for focus detection.

A photographer can confirm the focus state and the composition of an optical image of the object obtained through the lens unit 150 by observing the image formed on the focusing screen 13 through a pentaprism 14 and the finder 16.

The imaging unit 22 is an imaging device configured of a CCD, a CMOS device, or the like converting an optical image into an electrical signal. An A/D converter 23 converts an analog signal into a digital signal. The A/D converter 23 is used for converting an analog signal output from the imaging unit 22 to a digital signal. A shutter 101 is a shutter provided with an aperture function.

An image processing unit 24 performs predetermined pixel interpolation, a resize process such as reduction, and a color conversion process on data from the A/D converter 23, or data from a memory control unit 15. In addition, in the image processing unit 24, a predetermined calculation process using data of the captured image is performed, and the system control unit 50 performs exposure control and ranging control according to the obtained calculation result. Thus, a through the lens (TTL) type AF process, an AE process, and a flash preliminary emission (EF) process are performed. Furthermore, in the image processing unit 24, a predetermined calculation process is performed using the data of the captured image, and a TTL type AWB (automatic white balance) process is also performed according to the obtained calculation result.

Data output from the A/D converter 23 is directly written in a memory 32 via the image processing unit 24 and the memory control unit 15, or via the memory control unit 15. The memory 32 stores image data obtained by the imaging unit 22 and converted into digital data by the A/D converter 23, and image data to be displayed on the display unit 28. The memory 32 has a sufficient storage capacity to store a predetermined number of still images, moving images, and sound for a predetermined time period.

In addition, the memory 32 also serves as a memory (video memory) for image display. A D/A converter 19 converts data for image display stored in the memory 32 into an analog signal and supplies the signal to the display unit 28. Thus, the image data for display written in the memory 32 is displayed by the display unit 28 via the D/A converter 19. The display unit 28 performs display on a display device such as an LCD according to the analog signal from the D/A converter 19. The digital signal subjected to A/D conversion by the A/D converter 23 and stored in the memory 32 is converted into an analog signal by the D/A converter 19 and is sequentially transmitted to and displayed on the display unit 28. Thus, the display unit 28 can function as an electronic viewfinder and can perform live view display.

A nonvolatile memory 56 is an electrically erasable and recordable memory, and for example, an EEPROM is used for the nonvolatile memory 56. The nonvolatile memory 56 stores a constant, a program, and the like for operating the system control unit 50. The program refers to a program for executing various flowcharts described below according to the present exemplary embodiment.

The system control unit 50 controls the digital camera 100. By executing the program recorded in the nonvolatile memory 56, each process of the present exemplary embodiment described below is realized. In a system memory 52, the constant, a variable, and the program for operating the system control unit 50 read out from the nonvolatile memory 56 are expanded, while a RAM is used for the system memory 52. The system control unit 50 also performs display control by controlling the memory 32, the D/A converter 19, the display unit 28, etc.

A system timer 53 is a time measurement unit measuring a time used for various control and measuring a time of an incorporated clock.

The mode selection switch 60, the shutter button 61, and the operation unit 70 are operation units for inputting various operation instructions to the system control unit 50. The mode selection switch 60 switches the operation mode of the system control unit 50 to one of a still image recording mode, the moving image shooting mode, the play mode, etc. The still image recording mode includes an automatic shooting mode, an automatic scene determination mode, a manual mode, an aperture prioritized mode (Av mode), and a shutter-speed prioritized mode (Tv mode). The still image recording mode also includes various scene modes that are shooting settings for each captured scene, a program AE mode, a custom mode, etc. The mode is directly switched to one of these modes included in a menu screen via the mode selection switch 60. Alternatively, the mode can be switched to one of these modes included in the menu screen by using another operation member after the screen is switched to the menu screen via the mode selection switch 60. Similarly, a plurality of modes can also be included in the moving image shooting mode.

A first shutter switch 62 is turned ON when the shutter button 61 provided on the digital camera 100 is half-pressed (shooting preparation instruction) during the operation of the shutter button 61, and generates a first shutter switch signal SW1. The first shutter switch signal SW1 initiates operations such as the AF process, the AE process, the automatic white balance (AWB) process, and the EF process.

A second shutter switch 64 is turned ON when the operation of the shutter button 61 is completed, that is, when the shutter button 61 is fully-pressed (shooting instruction), and generates a second shutter switch signal SW2. The second shutter switch signal SW2 initiates a series of shooting processes from signal readout from the imaging unit 22 to writing of image data into the recording medium 200.

By selecting various function icons displayed on the display unit 28, a function for each scene is appropriately allocated to each of the operation members of the operation unit 70, and the operation members function as various function buttons. Examples of the function buttons include a termination button, a return button, an image forward button, a jump button, a narrowing-down button, and an attribute change button. For example, when the menu button is pressed, the menu screen on which various settings can be configured is displayed on the display unit 28. A user can intuitively configure various settings by using the menu screen displayed on the display unit 28 and the four-way (up, down, right, and left) button and the SET button.

The operation unit 70 includes various operation members serving as an input unit for accepting an operation from a user. The operation unit 70 includes a touch panel 70a that can accept a touch operation and at least the following operation units: the shutter button 61, the main electronic dial 71, the power switch 72, the sub electronic dial 73, the cross key 74, the SET button 75, the LV button 76, the enlargement button 77, the reduction button 78, and the play button 79.

A power supply control unit 80 includes a battery control circuit, a DC-DC converter, a switching circuit for switching a block to be energized, and detects whether a battery is attached, the type of the battery, and the remaining level of the battery. In addition, according to the detection results and an instruction from the system control unit 50, the power supply control unit 80 controls the DC-DC converter and supplies a required voltage to each unit including the recording medium 200 for a required period.

A power supply unit 30 includes a primary battery such as an alkaline battery or a lithium battery, a secondary battery such as a NiCd battery, NiMH battery, or a Li battery, an AC adapter, etc. A recording medium I/F is an interface with the recording medium 200. The recording medium 200 is a recording medium such as a memory card for recording a captured image, a magnetic disc, etc.

A communicating unit 54 is connected via radio or a cable and transmits and receives a video signal or an audio signal. The communicating unit 54 can also be connected to a wireless local area network (LAN) and the Internet. The communicating unit 54 can transmit an image (including a live image) captured by the imaging unit 22 and an image recorded in the recording medium 200. In addition, the communicating unit 54 can receive image data and various types of information other than the image data from an external apparatus.

The operation unit 70 also includes touch panel 70a (provided overlapping the display unit 28), which can detect contact (touch) with the display unit 28. The touch panel 70a and the display unit 28 can be integrally configured. For example, the touch panel 70a is configured such that the light transmittance is set so as not to hinder display of the display unit 28, and the touch panel 70a is attached to an upper layer of the display surface of the display unit 28. Input coordinates on the touch panel and display coordinates on the display unit 28 are associated with each other. Thus, it is possible to configure a graphical user interface (GUI) that enables the user to directly operate the screen displayed on the display unit 28. The system control unit 50 can detect the following operations for the touch panel 70a or the following states of the touch panel 70a.

The fact that a finger, stylus, etc., that have not touched the touch panel newly touches the touch panel, that is, start of touch (hereinafter referred to as "Touch-Down").

The state where the touch panel is touched by a finger, stylus, etc. (hereinafter referred to as "Touch-On").

The fact that a finger, stylus, etc., move on the touch panel while maintaining contact with the touch panel (hereinafter referred to as "Touch-Move").

The fact that a finger, stylus, etc., that are contact with the touch panel are removed from the touch panel, that is, termination of touch (hereinafter referred to as "Touch-Up").

The state where nothing touches the touch panel (hereinafter referred to as "Touch-Off").

When Touch-Down is detected, Touch-On is simultaneously detected. Unless Touch-Up is detected after Touch-Down, detection of Touch-On typically continues. Touch-Move is detected in a state where Touch-On is detected. Even when Touch-On is detected, Touch-Move is not detected unless the touch position is moved. After Touch-Up of anything, fingers, stylus, etc., in contact with the touch panel is detected, the state moves to Touch-Off.

The system control unit 50 is notified, via an internal bus, of these operations and states and coordinates of the position on the touch panel where a finger, stylus, etc., touch and the system control unit 50 determines which operation has been performed on the touch panel according to the notified information. Regarding Touch-Move, the moving direction of a finger, stylus, etc., that moves on the touch panel can be determined for each vertical component and horizontal component on the touch panel according to a change in position coordinates. In addition, when Touch-Up is performed after Touch-Down is performed and then a certain Touch-Move is performed on the touch panel, is assumed that a stroke is drawn. An operation of quickly drawing a stroke is referred to as a "flick". More specifically, a flick is an operation of quickly moving a finger, stylus, etc., for a certain distance on the touch panel while the finger, stylus, etc., continue contacting the touch panel and then removing the finger, stylus, etc., from the touch panel without interruption. For example, an operation of quickly running a finger on the touch panel like tapping the touch panel with the finger. When it is detected that Touch-Move is performed for a predetermined distance or longer at a predetermined speed or higher, and then Touch-Up is detected without interruption, it can be determined that a flick has been performed. In addition, it is assumed that in a case where it is detected that Touch-Move is performed for a predetermined distance or longer at a speed less than a predetermined speed, it is determined that drag is performed. Any type of touch panel from among various types of touch panels, such as a resistive film type, an electrostatic capacitance type, a surface acoustic wave type, an infrared ray type, an electromagnetic induction type, an image recognition type, or an optical sensor type touch panel can be used as the touch panel. In addition, both a touch panel where touch is detected when there is contact with the touch panel and a touch panel where touch is detected by bringing a finger, stylus, etc., within proximity to the touch panel are applicable.

Figure 3A:
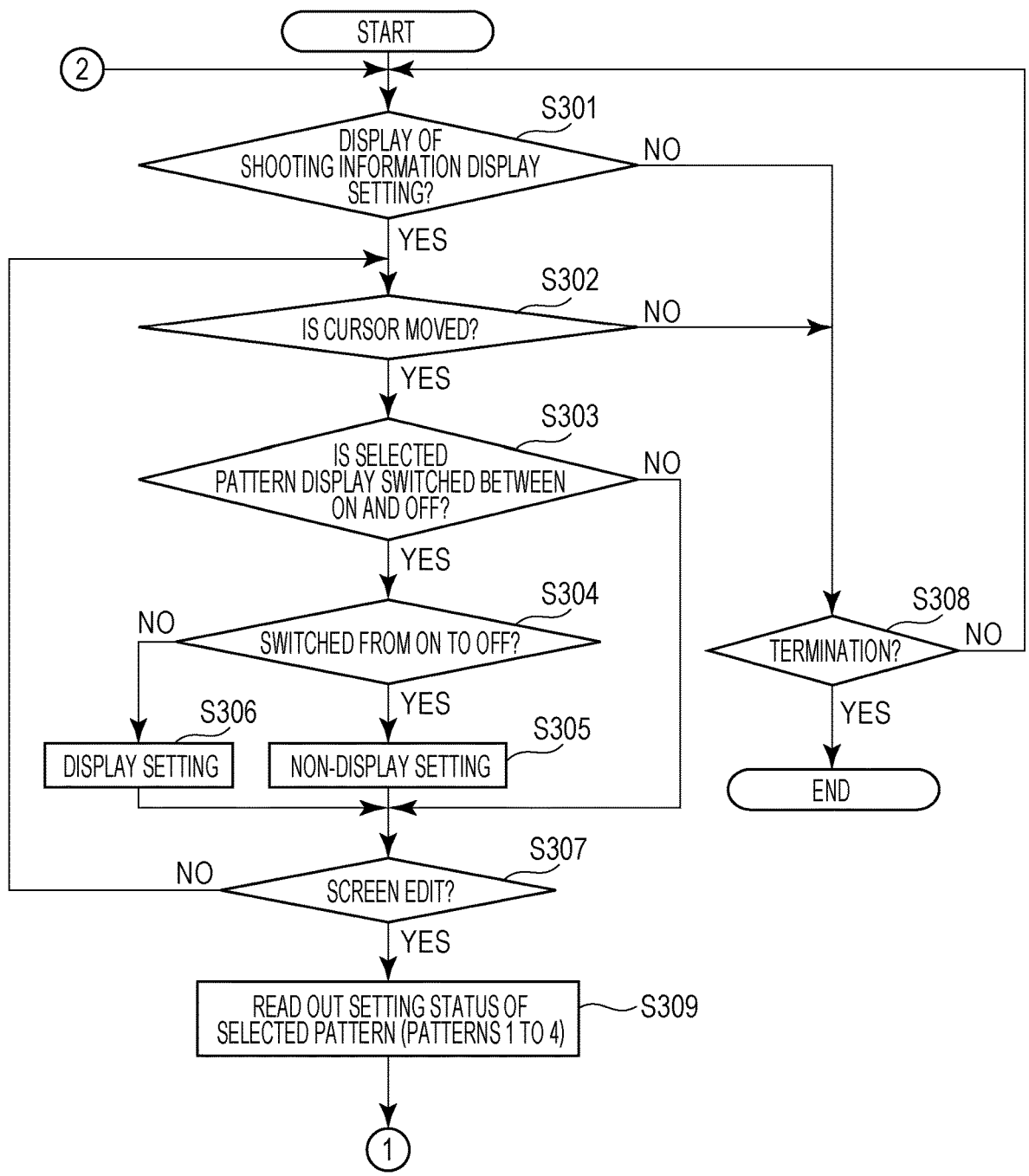
FIGS. 3A and 3B are flowcharts illustrating a shooting information display setting process.
Figure 3B:
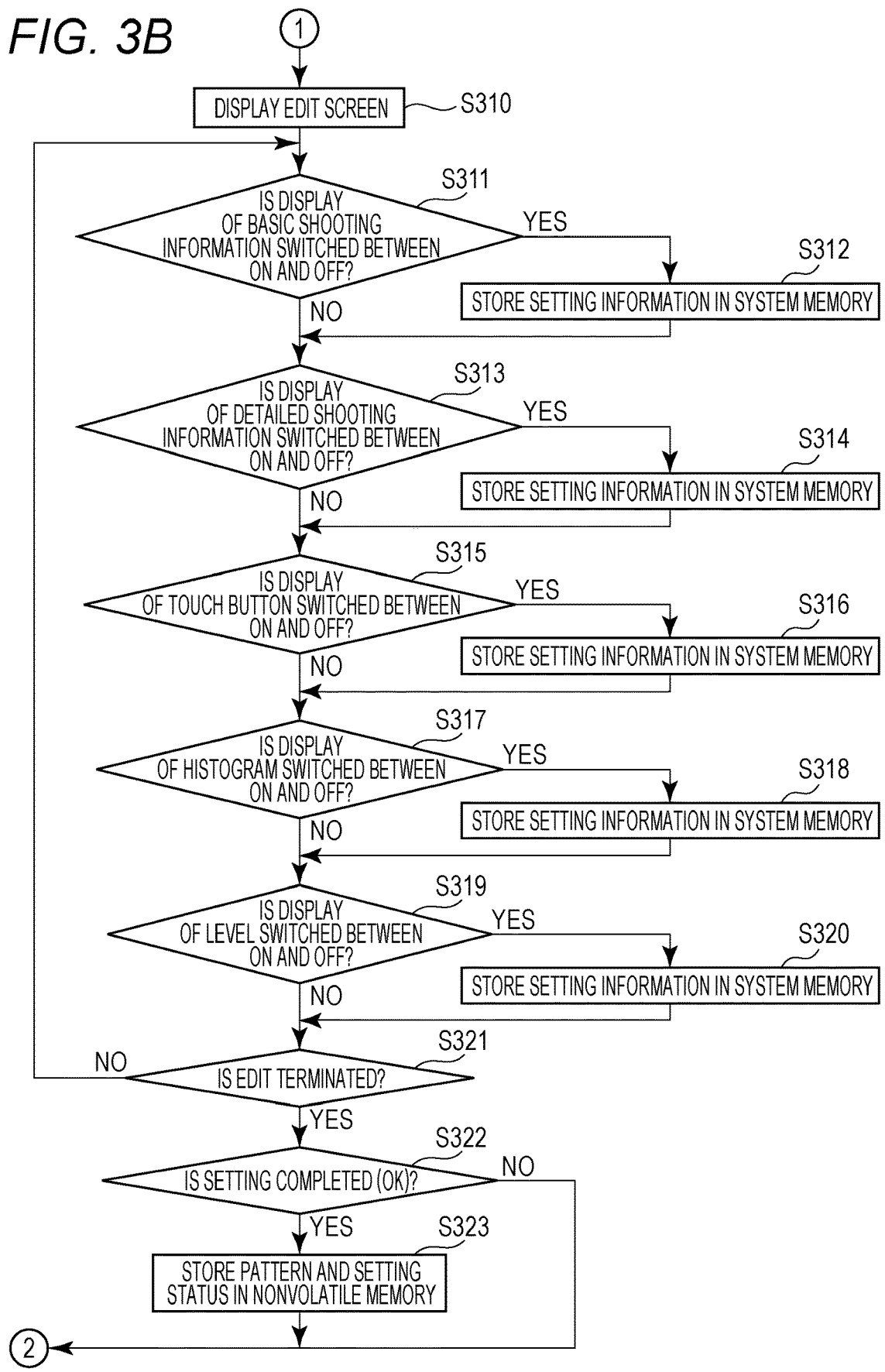

FIGS. 3A and 3B illustrates flowcharts illustrating a shooting information display setting process. The shooting information display process is realized by expanding the program recorded in the nonvolatile memory 56 in the system memory 52 and causing the system control unit 50 to execute the program. This process is initiated when the digital camera 100 is turned ON and the menu screen is opened. The following process is described assuming that a touch operation is set to be effective.

Figure 4A:
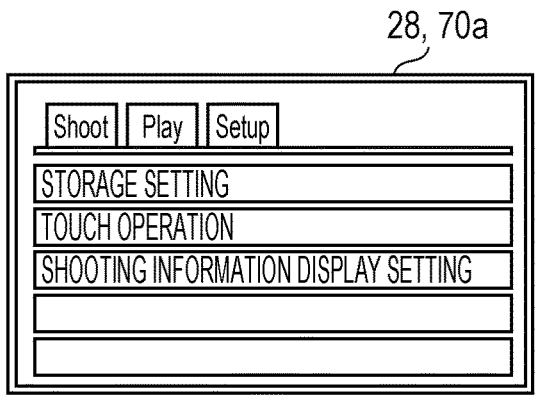
FIGS. 4A to 4E are display screen examples regarding shooting information display setting.

In S301, the system control unit 50 determines whether display of shooting information display setting is selected. FIGS. 4A to 4E illustrate display screens regarding the shooting information display setting. FIG. 4A illustrates the menu screen, and FIGS. 4B to 4E illustrate switching setting screens. As illustrated in FIG. 4A, the shooting information display setting is included in a Set up field of the menu screen. Display example 405 in FIG. 4B corresponds to an edit screen in FIG. 5A, display example 406 in FIG. 4C corresponds to an edit screen in FIG. 5B, display example 407 in FIG. 4D corresponds to an edit screen in FIG. 5C, and display example 408 in FIG. 4E corresponds to an edit screen in FIG. 5D. As described, in a case where it is determined that the item of the shooting information display setting in FIG. 4A is selected, the process proceeds to S302. Otherwise, the process proceeds to S308.

In S302, the system control unit 50 displays the switching setting screen and determines whether a cursor has moved.

The cursor is moved by an operation of the upper or lower button of the cross key 74, and a touch operation for one of icons 402a to 402d, each indicating a pattern. There are four patterns indicated by the icons 402a to 402d illustrated in FIGS. 4B to 4E, respectively. By pressing down the info button 68 in an LV screen, described below, the pattern can be switched such that patterns 1 to 4 (or screens 1 to 4) are sequentially displayed on the display unit 28. When the cursor moves to one of the icons 402a to 402d, from among the switching setting screens (display examples 405 to 408) allocated to the icons 402a to 402d as illustrated in FIGS. 4B to 4E, the switching setting screen corresponding to the icon where the cursor is positioned is displayed. A user can more easily recognize what kind of information display setting is configured (state of display items to be displayed) on which pattern (display mode) by moving the cursor and viewing the display examples. In addition, while viewing the display examples, a user can select the pattern to be switched to be displayed or hidden and can select the pattern to be edited, which is described below. In a case where it is determined that the cursor has moved, the process proceeds to S303; otherwise, the process proceeds to S308. In addition, in a case where the cursor has moved, the position where the cursor is displayed (the icon to be displayed in a superimposed manner) is changed, and the display example is further switched. For example, switching of the display example means switching among display examples 405 to 408 of FIGS. 4B to 4E, and the display example is sequentially switched to the pattern where the cursor is positioned.

Figure 4B:
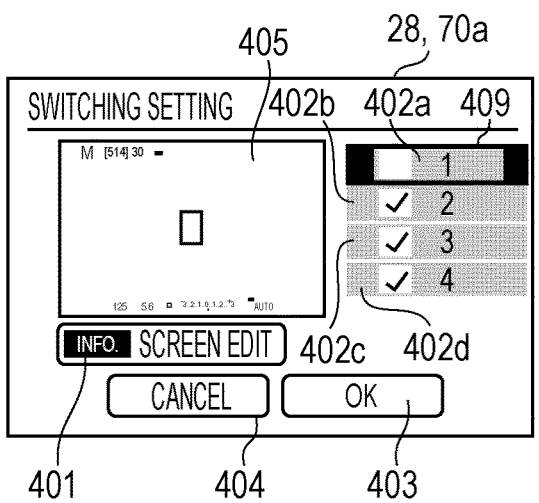
Figure 4C:
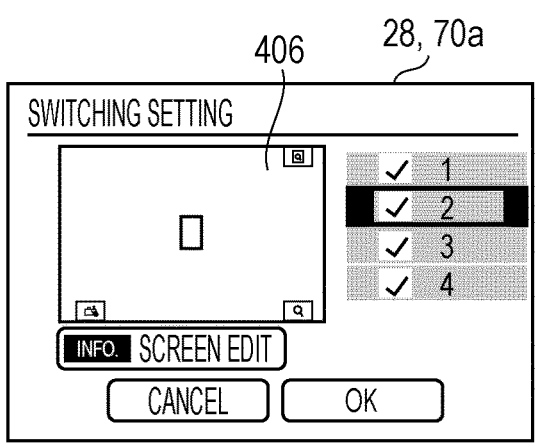
Figure 4D:
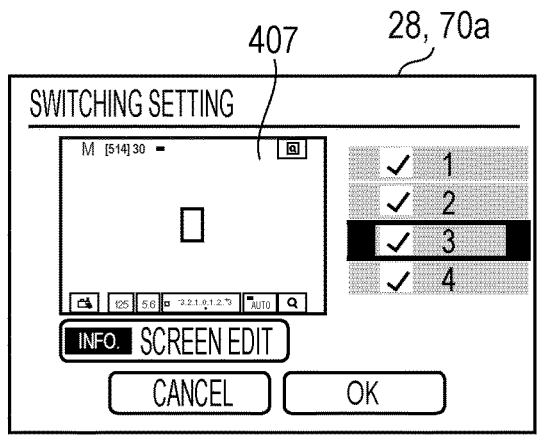
Figure 4E:
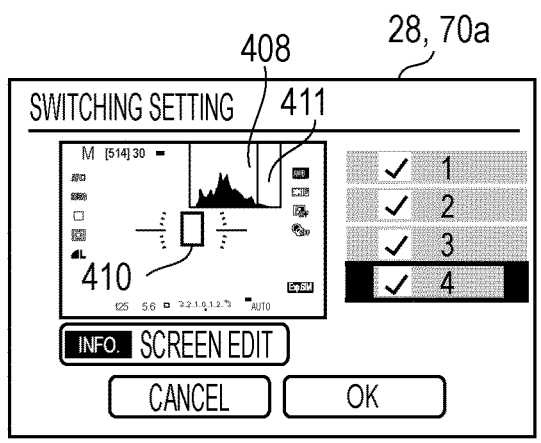

In S303, the system control unit 50 determines whether pattern display of the pattern (selected pattern) where the cursor is positioned in S302 is switched between ON and OFF. In a case where pattern 1 is hidden (OFF), the check mark can be removed as in the icon 402a indicating pattern 1 in FIG. 4B. In a case where pattern 1 is displayed (ON), the check mark can be added. When pattern is hidden as illustrated in FIG. 4B, the number of patterns to be switched by the info button 68 on the LV screen is three. Switching of the pattern display and switching between display and non-display of the check mark can be performed by touching the icon 402a or pressing down the SET button 75 in a state where the cursor 409 is positioned on the icon 402a. When it is determined that switching between ON and OFF of the pattern display has been performed, the process proceeds to S304. Otherwise, the process proceeds to S307.

In S304, the system control unit 50 determines whether the selected pattern display is switched from ON to OFF. When it is determined that the selected pattern display is switched from ON to OFF, the process proceeds to S305. Otherwise, the process proceeds to S306.

In S305, the system control unit 50 stores in the system memory 52 information indicating that the selected pattern is a hidden pattern that will not be displayed even when the info button 68 is pressed down, and hides the check mark of the icon where the cursor is positioned. All the patterns are set to be displayed in an initial setting status not changed by the user and stored in the system memory 52.

In S306, the system control unit 50 stores in the system memory 52 information indicating that the selected pattern is a display pattern that will be displayed when the info button 68 is pressed down, and displays the check mark on the icon where the cursor is positioned.

In S307, the system control unit 50 determines whether screen edit is selected. Screen edit is selected by touching the icon 401 (INFO. screen edit) in FIG. 4B, or pressing down the info button 68. In a case where it is determined that screen edit is selected, the process proceeds to S308. Otherwise, the process returns to S302.

In S308, the system control unit 50 determines whether the shooting information display setting will be terminated. In a case where it is determined that the shooting information display setting will be terminated, the shooting information display setting is terminated. Otherwise, the process returns to S301. The shooting information display setting can be terminated by touching an icon 403 indicating OK meaning setting completion in FIG. 4B to 4E or an icon 404 indicating cancel canceling the setting, or pressing down the SET button 75 after the cursor has moved to the icon 403 or the icon 404. In a case where OK is selected, the set content (settings stored in the system memory 52) is stored in the nonvolatile memory 56. In a case where cancel is selected, settings are not changed.

In S309, the system control unit 50 reads out the setting status of the selected pattern from the nonvolatile memory 56 and expands the setting status in the system memory 52.

In S310, the system control unit 50 displays the edit screen on the display unit 28. FIGS. 5A to 5D illustrate display examples of the edit screens in respective patterns. FIG. 5A is an edit screen of pattern 1, FIG. 5B is an edit screen of pattern 2, FIG. 5C is an edit screen of pattern 3, and FIG. 5D is an edit screen of pattern 4. In FIGS. 5A to 5D, icons 501 to 505 display types of information to be displayed in each pattern as options. The icon 501 indicates basic shooting information, the icon 502 indicates detailed shooting information, the icon 503 indicates a touch button, the icon 504 indicates a histogram, and the icon 505 indicates a level.

In S311, the system control unit 50 determines whether display of the basic shooting information is switched between ON and OFF. Each information display indicated by each of the icons 501 to 505 can be switched between ON and OFF by touching each icon or pressing down the SET button 75 while the cursor is positioned on the desired icon. In FIG. 5A, a check mark is placed only on the basic shooting information indicated by the icon 501, and only the basic shooting information is displayed as illustrated in display example 509, which is an edit example of pattern 1. Unless display of the touch button (setting of the touch button) is switched to ON, the basic shooting information is not displayed as a touchable icon (touchable display item), but is displayed as information display (a guide) not accepting a touch operation. Information display not accepting a touch operation means a display item where a corresponding process will not be performed even when a touch operation is performed for the display item. In a case where it is determined that display of the basic shooting information has been switched between ON and OFF, the process proceeds to S312. Otherwise, the process proceeds to S313.

In S312, the system control unit 50 stores setting information on display of the basic shooting information (ON or OFF) in the system memory 52.

In S313, the system control unit 50 determines whether display of the detailed shooting information has been switched between ON and OFF. In FIG. 5D, a check mark is placed on the detailed shooting information indicated by the icon 503, and the detailed shooting information is displayed as illustrated in display example 512, which is an edit example of pattern 4. In a case where display of the detailed shooting information has been switched between ON and OFF, the process proceeds to S314. Otherwise, the process proceeds to S315.

In S314, the system control unit 50 stores setting information on display of the detailed shooting information (ON or OFF) in the system memory 52.

In S315, the system control unit 50 determines whether display of the touch button has been switched between ON and OFF. In FIG. 5B, a check mark is placed only on the touch button indicated by the icon 503, and only touch buttons are displayed as illustrated in display example 510, which is an edit example of pattern 2. The touch button is displayed as a touch button which can accept a touch operation in the LV screen, as described below. Note that in the display example 510 of the edit screen in FIG. 5B, the touch button is displayed such that the touch button is encircled, which indicates that the touch button is touchable. However, since the display example 510 indicates the display example in the pattern that is being set, in reality, the touch button cannot accept a touch operation. In addition, in FIG. 5C, check marks are placed on the basic shooting information indicated by the icon 501 and the touch button indicated by the icon 503, and display is performed as illustrated in display example 511. That is, in addition to the touch buttons illustrated in FIG. 5B, some display items, e.g., the shutter speed, the aperture, the ISO sensitivity, etc., of the basic shooting information are displayed as touch buttons, and the remaining display items, e.g., the mode, the number of images, the remaining level of the battery, etc., are displayed as information display (guides) that do not accept a touch operation. In a case where it is determined that display of the touch button has been switched between ON and OFF, the process proceeds to S316. Otherwise, the process proceeds to S317.

In step S316, the system control unit 50 stores setting information on display of the touch button (ON or OFF) in the system memory 52.

In S317, the system control unit 50 determines whether display of the histogram has been switched between ON and OFF. In FIG. 5D, a check mark is placed on the histogram indicated by the icon 504, and the histogram is displayed as illustrated in display example 512, which is an edit example of pattern 4. In a case where it is determined that display of the histogram has been switched between ON and OFF, the process proceeds to S318. Otherwise, the process proceeds to S319.

In S318, the system control unit 50 stores setting information on display of the histogram (ON or OFF) in the system memory 52.

In S319, the system control unit 50 determines whether display of the level has been switched between ON and OFF. In FIG. 5D, a check mark is placed on the level indicated by the icon 505, and the level is displayed as illustrated in display example 512, which is an edit example of pattern 4. In a case where it is determined that display of the level has been switched between ON and OFF, the process proceeds to S320. Otherwise, the process proceeds to S321.

In S320, the system control unit 50 stores setting information on display of the touch button (ON or OFF) in the system memory 52.

In S321, the system control unit 50 determines whether edit is terminated. In a case where the edit is terminated, the process proceeds to S322. Otherwise, the process returns to S311. Edit can be terminated by touching the icon 507 indicating OK, which means setting completion in FIGS. 5A to 5D, the icon 508 indicating canceling the setting, or by pressing down the SET button 75 after the cursor has moved to the icon 507 or the icon 508. When it is determined that the edit is terminated, the process proceeds to S322. Otherwise, the process returns to S311 and edit can be continued.

In S322, the system control unit 50 determines whether the operation performed in S321 is selection of the icon 507 (OK) or selection of the icon 508 (cancel). In a case where it is determined that the operation is selection of the icon 507 indicating setting completion, the process proceeds to S323. Otherwise, the process returns to S301. In a case where cancel is selected, settings edited in S311 to S320 are not stored in the nonvolatile memory 56.

In S323, the system control unit 50 stores the selected pattern and the settings set in S311 to S320 in association with each other in the nonvolatile memory 56. In a case where the info button 68 is pressed down on the LV screen, information display of each pattern is sequentially performed by reading out the setting information stored in S323. Since information display can be set for each pattern by changing information display content, such as the number of items to be displayed or the operation state, a user can set information display in various combinations of pieces of information according to the types of information the user wishes to refer to.

Next, an information display process will be described with reference to FIGS. 6A and 6B. This process is realized by expanding the program recorded in the nonvolatile memory 56 in the system memory 52 and causing the system control unit 50 to execute the program. Note that this process is initiated when the digital camera 100 is turned ON.

In S601, the system control unit 50 determines whether the mode has been switched to the shooting mode. The mode can be switched to the shooting mode via the mode selection switch 60. In a case of the play mode, the mode can also be switched to the shooting mode by pressing down the play button 79. When it is determined that the mode has been switched to the shooting mode, the process proceeds to S602. Otherwise, the process proceeds to S603.

Figure 8A:
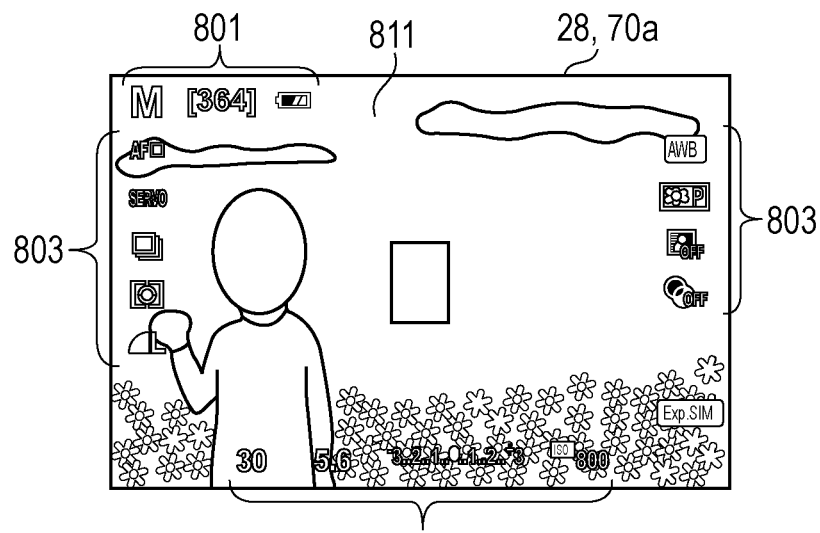
FIGS. 8A to 8C are examples of live view screen display.
Figure 8B:
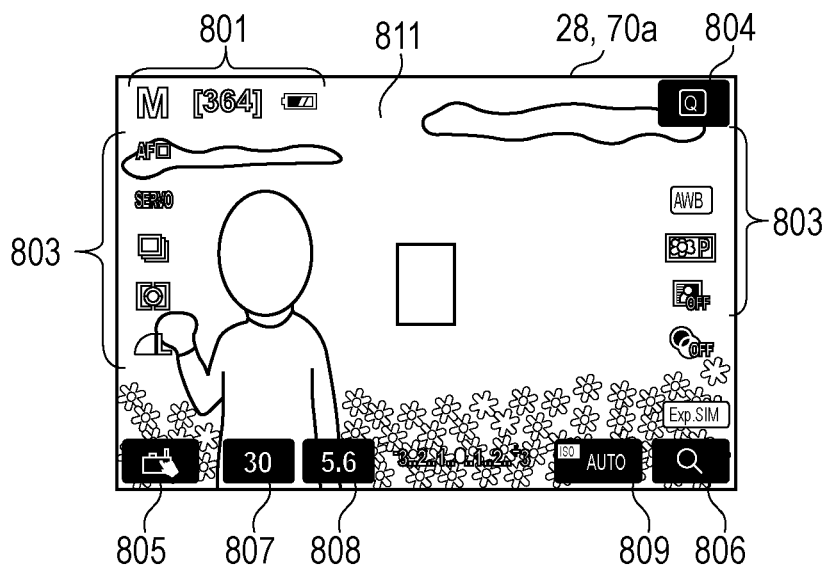
Figure 8C:
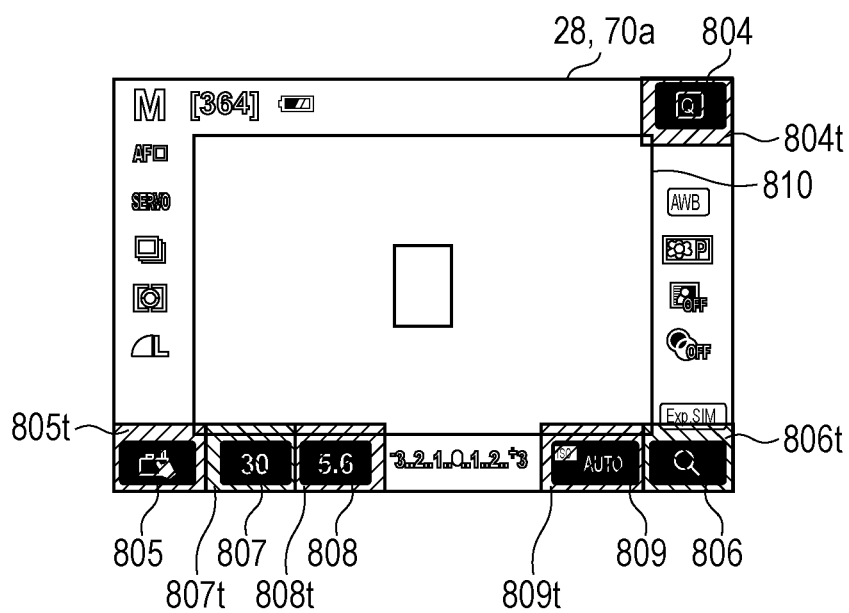

In S602, the system control unit 50 displays a live view image 811 (captured image) on the display unit 28 as illustrated in FIGS. 8A and 8B. FIGS. 8A, 8B, and 8C are views illustrating information display examples on the display unit 28, and the information display examples can be switched from one to another by pressing down the info button 68. FIG. 8A illustrates a case where there are no touchable icons. FIG. 8B illustrates a case where there are touchable icons. FIG. 8C is an explanatory view for illustrating an AF range and a touch button sensitive region. As illustrated in FIG. 8C, the touch button sensitive region is provided along the edges of the touch panel, and the icons are displayed along the edges.

In S603, the system control unit 50 performs a play process of an image in the play mode, menu display, a setting process, and the like on the menu screen.

In S604, the system control unit 50 reads out the pattern currently being set and the setting status of the pattern being set, the setting status being set in the aforementioned shooting information display setting from the system memory 52 (the setting status of each pattern has already been read out from the nonvolatile memory 56).

In S605, the system control unit 50 determines whether display of the basic shooting information is turned ON in the read-out setting status. Display of the basic shooting information is turned ON in a case of a setting status illustrated as pattern 1 in FIG. 5A or pattern 3 in FIG. 5C. Display of the basic shooting information is turned OFF in a case of a setting status illustrated as pattern 2 in FIG. 5B. In the case where it is determined that display of the basic shooting information is turned ON, the process proceeds to S606. Otherwise, the process proceeds to S609.

In S606, the system control unit 50 determines whether display of the touch button is turned ON in the read-out setting status. Display of the touch button is tuned ON in a case of a setting status illustrated as pattern 2 in FIG. 5B or pattern 3 in FIG. 5C. In a case of a setting status illustrated as pattern 1 in FIG. 5A, display of the touch button is turned OFF. When it is determined that display of the touch button is turned ON, the process proceeds to S607. Otherwise, the process proceeds to S608.

In S607, as illustrated in FIG. 8B, the system control unit 50 displays a touch button 807 indicating shutter speed, a touch button 808 indicating the aperture, and a touch button 809 indicating ISO sensitivity. That is, display items (in a case where display of the touch button is turned OFF, items displayed as information display (guides)) are displayed such that the display items can accept a touch operation. Other basic shooting information, illustrated in a guide 801, is displayed in a display form not accepting a touch operation. In addition, a touch button 805 indicating a touch shutter button, a touch button 806 indicating an enlargement button, and a touch button 804 indicating a Q button are displayed in a display form capable of accepting a touch operation.

In S608, as illustrated in FIG. 8A, the system control unit 50 displays basic shooting information in the guide 801 and a guide 802 on the display unit 28. Since the guide 801 is a guide that does not accept a touch operation in both the case where display of the touch button is turned ON (S607) and in the case where display of the touch button is turned OFF (S608), the display form of the guide 801 does not change. An item that is set by rotation of a dial, which is a physical member, or a guide indicating the status, such as the remaining level of the battery, the possible number of picked-up images, or the like, can be set as an item for which a touch operation for setting change or the like is disabled regardless of whether display of the touch button is set to be ON or OFF, and can be displayed in the same display form in the both cases. In addition, the set value and the setting status of each item indicated by the touch button displayed in a case where display of the touch button is turned ON and the set value and the setting status of each item indicated by the guide 802 displayed in a case where display of the touch button is turned OFF are the same. When the info button 68 is pressed down while the set value and the setting status of each item indicated by each of the touch buttons 807 to 809 in FIG. 8B remain unchanged, display content identical to that indicated by each touch button is displayed as a guide in a state where a touch operation is disabled. In addition, since the position where each item (guide or touch button) is displayed is the same in both the case where display of the touch button is turned ON and the case where display of the touch button is turned OFF. Since an item (guide or touch button) is displayed in the same position when display of the touch button is turned ON and when display of the touch button is turned OFF, in a case of changing the settings of a certain guide after confirming the settings of the guide, the settings can be changed immediately after display of the touch button is switched to be ON without searching for the touch button corresponding to the guide to be changed in settings.

In S609, the system control unit 50 determines whether display of the touch button is turned ON in the read-out setting status in the same manner as in S606. In a case where it is determined that display of the touch button is turned ON, the process proceeds to S610. Otherwise, the process proceeds to S611.

In S610, as illustrated in FIG. 8B, the system control unit 50 displays the touch button 805 indicating a touch shutter button, the touch button 806 indicating an enlargement button, and the touch button 804 indicating a Q button in a display form capable of accepting a touch operation. Since display of the basic shooting information is turned OFF at that time, the touch buttons 807 to 809 illustrated in FIG. 8B are not displayed.

In S611, the system control unit determines whether display of the detailed shooting information is set to be ON. In a case where it is determined that display of the detailed shooting information is set to be ON, the process proceeds to S612. Otherwise, the process proceeds to S613.

In S612, the system control unit 50 displays the detailed shooting information on the display unit 28 as illustrated as the guide 803 in FIGS. 8A and 8B.

In S613, the system control unit 50 determines whether display of the histogram is set to be ON. In a case where display of the histogram is set to be ON, the process proceeds to S614. Otherwise, the process proceeds to S615.

In S614, the system control unit 50 displays the histogram on the display unit 28. The histogram is displayed as a graph 411 (guide) illustrated in display example 408 in FIG. 4E.

In S615, the system control unit 50 determines whether display of the level is set to be ON. In a case where the level is set to be ON, the process proceeds to S616. Otherwise, the process proceeds to S617.

In S616, the system control unit 50 displays the level on the display unit 28. The level is displayed as an indicator 410 (guide) illustrated in display example 408 in FIG. 4E.

In S617, the system control unit 50 determines whether pattern switching of information display to be displayed on the display unit 28 is performed by pressing down the info button 68. In a case where it is determined that the pattern switching is performed, the process proceeds to S604. Otherwise, the process proceeds to S618. By pattern switching, display of the pattern described in FIGS. 3A and 3B can be switched. For example, in a case where display of the touch button indicated by the icon 503 is set to be OFF in pattern 1 and is set to be ON in pattern 2, when the pattern is switched from pattern 1 to pattern 2, display of the touch button can be switched from OFF to ON. In other words, in a case where display of the basic shooting information is set in both pattern 1 and pattern 2, the basic shooting information can be displayed as a guide, which does not accept touch, or can be displayed as a touch button, which accepts touch, by performing pattern switching. As described, it is possible to switch information display between a touch button (first state) and a guide (second state) by performing pattern switching. However, even when switching between the guide and the touch button is performed by pattern switching, setting of enabling or disabling a touch operation for setting whether to perform a process according to the touch operation is not changed. That is, when display of a touch operation is set to be OFF in a case where a touch operation is enabled, the function corresponding to the touch button displayed when display of the touch button is set to be ON will not be executed by touching. However, another touch operation for setting the AF position, or the like remains enabled.

In S618, the system control unit 50 determines whether an operation for terminating the information display process has been performed. The information display process is performed, for example, by switching the mode to the play mode, displaying the menu screen, or turning OFF the power supply. In a case where it is determined that the operation for terminating the information display process has been performed, the information display process is terminated. Otherwise, the process proceeds to S619.

Figure 7A:
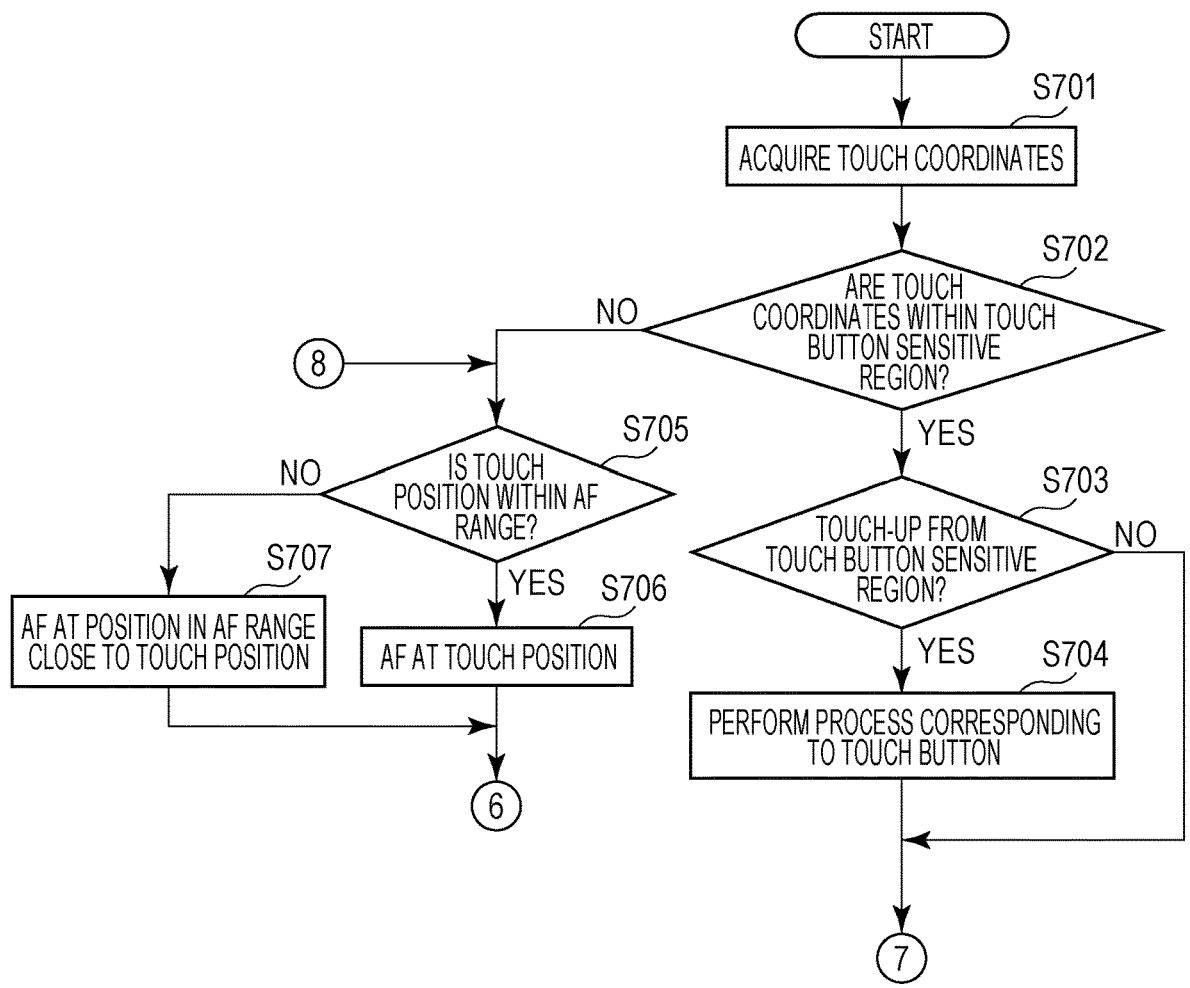
FIGS. 7A and 7B are flowcharts illustrating a process regarding a touch operation.
Figure 7B:
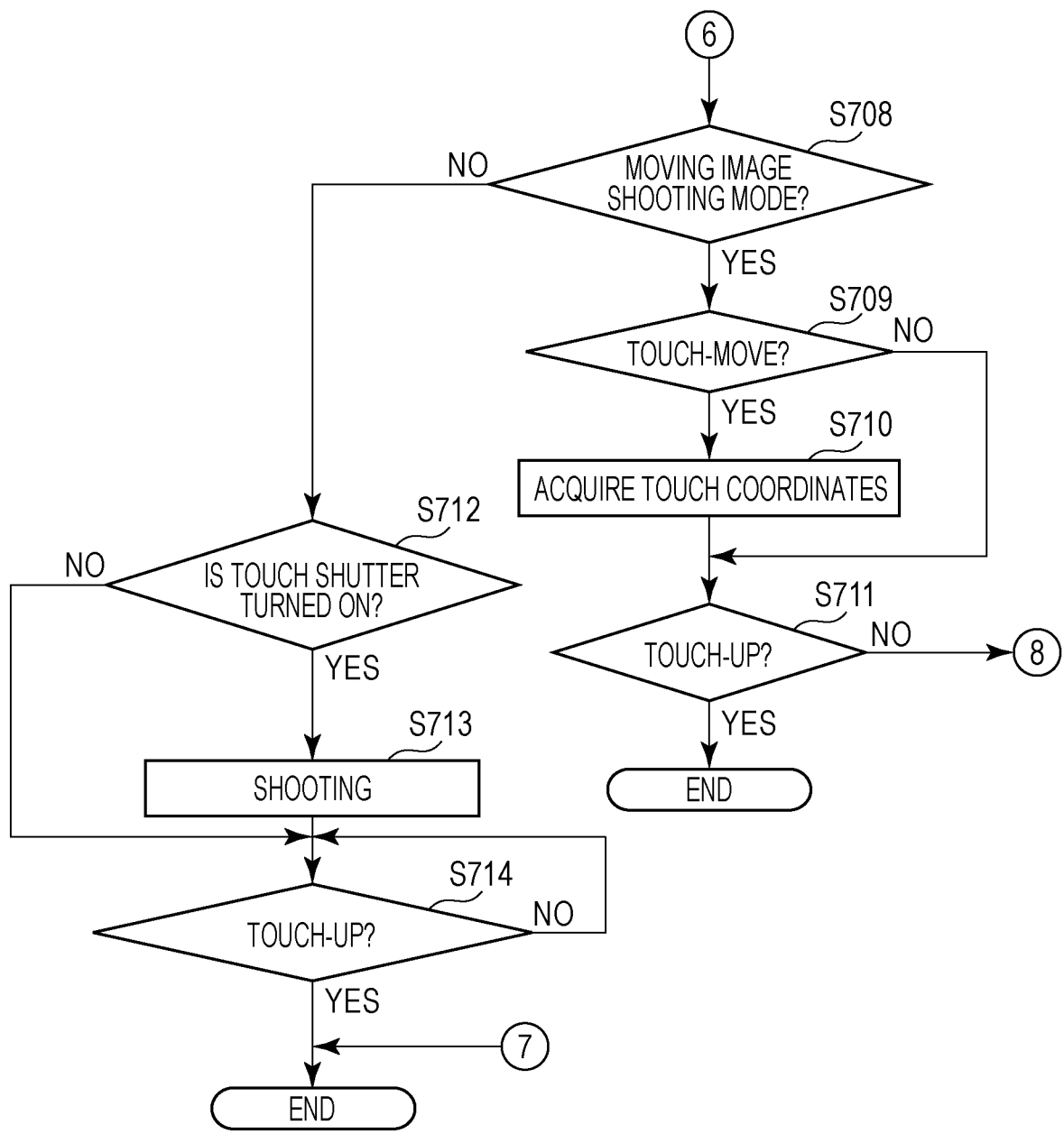

In S619, the system control unit 50 determines whether a touch operation for the touch panel 70a (display unit 28) has been performed. In a case where it is determined that the touch operation has been performed, the process proceeds to S620, and a process regarding the touch operation to be described in FIGS. 7A and 7B are performed. Otherwise, the process returns to S601.

The process regarding S620 will be described with reference to the flowcharts illustrating the touch operation in FIGS. 7A and 7B. This process is realized by expanding the program recorded in the nonvolatile memory 56 in the system memory 52 and causing the system control unit 50 to execute the program.

Figure 6A:
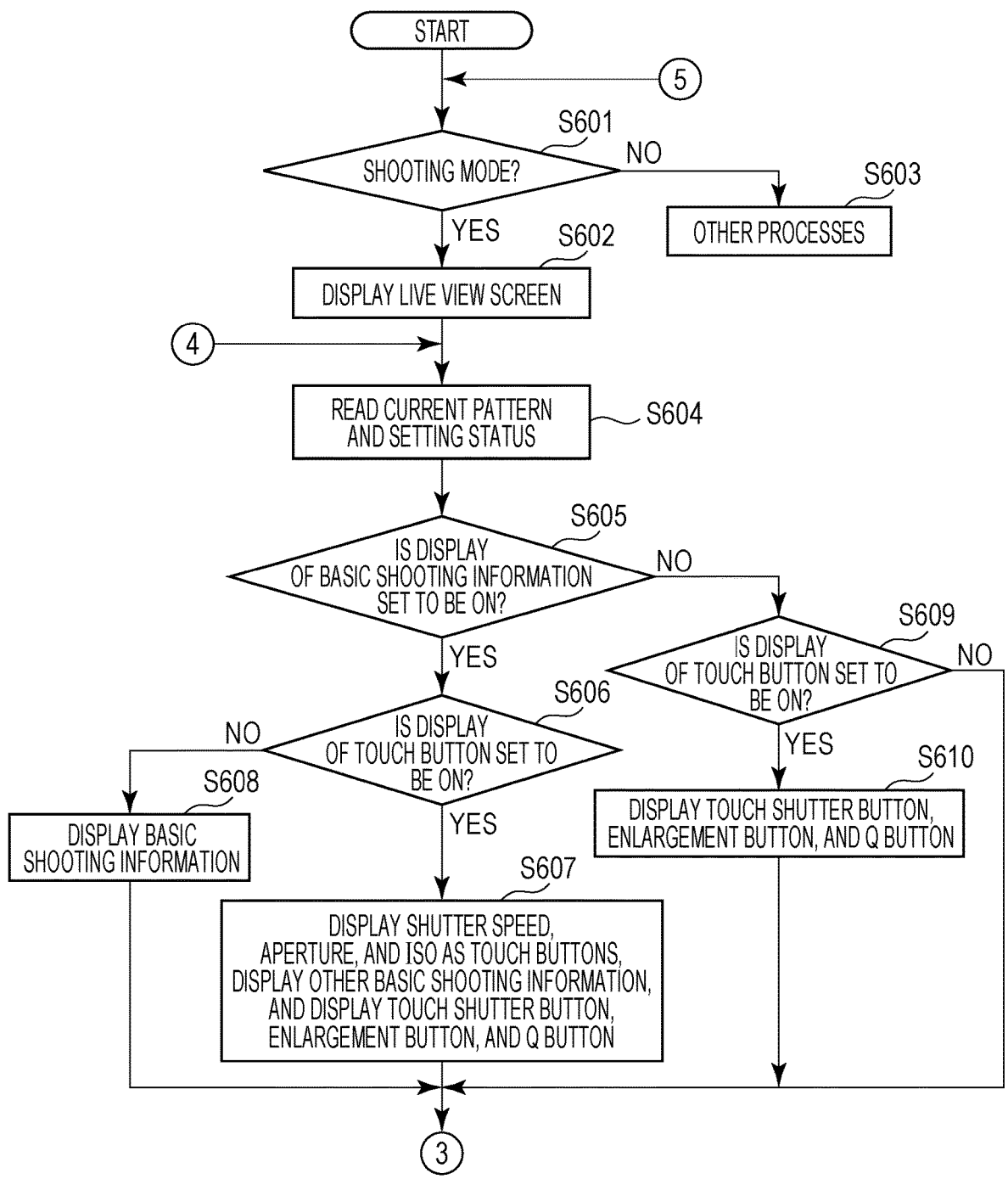
FIGS. 6A and 6B are flowcharts illustrating a shooting information display process.
Figure 6B:
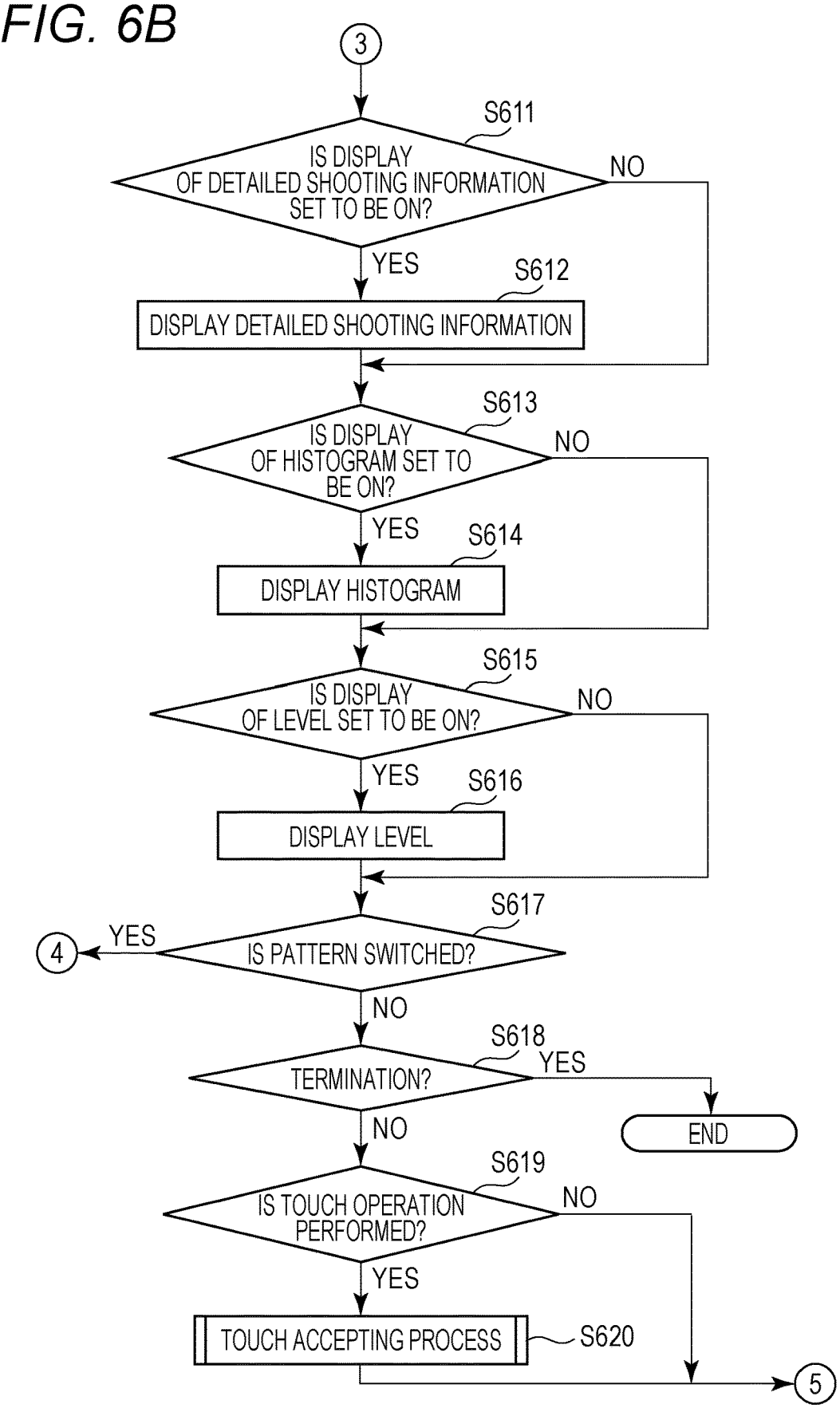

In S701, the system control unit 50 acquires touch coordinates of the touch operation detected in S619 in FIG. 6B.

In S702, the system control unit 50 determines whether the touch coordinates are in the touch button sensitive region. In a case where the touch buttons 804 to 806 are displayed, the touch button sensitive region includes touch button sensitive regions 804t to 806t from among touch button sensitive regions 804t to 809t illustrated in FIG. 8C. In a case where the touch buttons 807 to 809 are also displayed, the touch sensitive region includes the touch button sensitive regions 807t to 809t in addition to the touch button sensitive regions 804t to 806t. Since there is no touch button sensitive region in a case where no touch buttons are displayed, determination of S702 is not performed and the process proceeds to S705. In a case where the touch coordinates acquired in S701 are included in the touch button sensitive region, the process proceeds to S703. Otherwise, the process proceeds to S705.

In S703, the system control unit 50 determines whether Touch-Up, that is, removing the touch position from the touch button sensitive region where touch is detected in S702, has been performed. In a case where it is determined that Touch-Up has been detected, the process proceeds to S304. Otherwise, the process is terminated. Even when the touch position is moved to a touch button sensitive region other than the touched touch button sensitive region, the process corresponding to the touch button, described in S704, will not be performed. In addition, even when the touch position has moved to the location other than the touch button sensitive region after the touch button sensitive region was touched, the AF process, described in S706 and S707, will not be performed.

In S704, the system control unit 50 executes the process corresponding to the touch button touched in the touch operation detected in S619 in FIG. 6B. When the Q button (touch button 804) is touched, the screen transitions to a quick setting screen accepting a change in the setting of an item regarding shooting. When the touch shutter button (touch button 805) is touched, touch shutter setting can be switched between ON and OFF. In a case where the touch shutter setting is turned ON, by touching a position on the live view screen (except the touch button sensitive area), a user can give a touch AF instruction and a shooting instruction corresponding to the touch position. Note that even when the touch shutter setting is turned OFF, touch AF is performed. When the enlargement button (touch button 806) is touched, the magnification of enlargement display of live view can be changed. When the touch button 807 indicating shutter speed is touched, the screen transitions to a shutter speed value setting screen. When the touch button 808 indicating the aperture is touched, the screen transitions to an aperture value setting screen. When the touch button 809 indicating the ISO sensitivity is touched, the screen transitions to an ISO value setting screen. In each of the shutter speed setting screen, the aperture value setting screen, and the ISO sensitivity setting screen, each setting value can be set or changed according to at least one of a touch operation or an operation for an operation member included in the operation unit 70. When the touch button is displayed as described above, the setting of an item can be easily changed by a touch operation.

In S705, the system control unit 50 determines whether the touch position is within the AF range. The AF range is the region inside an AF range 810 illustrated in FIG. 8C and not overlapping the touch button sensitive region. The AF range 810 indicates the range where a more precise AF process focusing on an object located at the touched position can be performed. In a case where an object located outside the AF range 810 is touched, the AF process focusing on (an object located at) the closest position within the AF range is performed. A touch operation for the AF process is enabled in any region even where a guide is displayed as long as a touch button is not displayed in the region. For example, touch AF is not performed when the region of the touch button 808 in FIG. 8B, that is, a region where a touch button is displayed, is touched. However, touch AF is performed when a region in the guide 802 in FIG. 8A, where no touch button is displayed is touched, the region being identical to the region of the touch button 808 in FIG. 8B. That is, in a case where a touch button is displayed, a touch operation for the touch button is enabled, and in a case where display of a touch button is turned OFF, a guide is displayed and the range where a user can touch as a position for which the AF process is performed and the range where an instruction to perform touch shutter can be given increases. In a case where it is determined that the touch position is within the AF range, the process proceeds to S706. Otherwise, the process proceeds to S707.

In S706, the system control unit 50 performs the AF process at the touch position.

In S707, the system control unit 50 performs the AF process at a position in the AF range close to the touch position. By performing the AF process as described above, it is possible to perform the AF process at a position closer to the position intended by a user. In addition, as that time, a guide or the like prompting a user to frame an object intended to be focused on such that the object is displayed within the AF range can be displayed. Note that in a case where the touch shutter is not turned ON, the AF process may not be performed in S706 or in S707, and the AF process can be performed when a shooting preparation instruction is given by means of the shutter button 61. That is, in S706 or S707, the position where the AF process is performed can be selected, the AF process can be performed at the position selected by pressing down the shutter button 61, and an image can be captured.

In S708, the system control unit 50 determines whether the mode is a moving image mode. The mode can be switched to the moving image shooting mode via the mode selection switch 60. In a case where it is determined that the mode is the moving image shooting mode, the process proceeds to S709. Otherwise, the process proceeds to S712.

In S709, the system control unit 50 determines whether Touch-Move, that is, moving the touch position, has been performed. In a case where it is determined that Touch-Move has been performed, the process proceeds to S710. Otherwise, the process proceeds to S711.

In S710, the system control unit acquires the coordinates of the touch position moved by performing Touch-Move.

In S711, the system control unit 50 determines whether Touch-Up, that is, an operation of releasing touch, has been performed. In a case where it is determined that Touch-Up has been performed, the process according to the touch operation is terminated, and the process returns to S601 in FIG. 6A. Otherwise, the process returns to S705 and the AF process is performed at the moved touch position.

The processes in S712 to S714 are the process in the case of the still image recording mode.

In S712, the system control unit 50 determines whether the touch shutter is set to be turned ON. The touch shutter can be turned ON or OFF by configuring settings on the menu screen or a touch operation for the touch button 805. When the touch shutter is set to be turned ON, the process proceeds to S713. Otherwise, the process proceeds to S714.

In S713, the system control unit 50 performs a still image shooting process.

In S714, the system control unit 50 determines whether Touch-Up, that is, an operation of releasing touch, has been performed in the same manner as in S711. In a case where it is determined that Touch-Up has been performed, the process according to the touch operation is terminated, and the process returns to S601 in FIG. 6A. Otherwise, the system control unit 50 waits until Touch-Up is performed.

Although not described in the description of the flowchart in FIG. 6A, while the LV screen is displayed (Yes in S601), a shooting preparation process is performed when the shutter button 61 is half-pressed. The shooting process is performed when the shutter button 61 is pressed fully. In the shooting preparation process, when the AF position has been set by a touch operation, the AF process is performed at the set AF position. In addition, regarding the shutter speed, the aperture, and the ISO sensitivity in the shooting process, set values set by touch operations for the aforementioned touch buttons 807 to 809, or operations of various operation members included in the operation unit 70 are used for capturing an image.

According to the above described exemplary embodiment, the likelihood that a process not intended by a user will be performed when a touch operation is performed can be lowered, while enabling the user to confirm the display content of an item. That is, in a case of specifying the position on the touch panel, if a guide displaying information is displayed in lieu of a touch button accepting a touch operation, a user can perform a touch operation while viewing display content of the guide (identical to the display content indicated by the touch button). Since information is displayed as a guide indicating the setting information identical to what is indicated by the touch button even though the information is not displayed as the touch button, a user can specify the touch position or give an instruction for shooting or the like while viewing the guide (confirming the current setting). In addition, the position where a specific process, such as AF, is performed can be specified in a state where the touchable range on the touch panel is not narrowed by the touch button. By pressing down the info button 68, the information display pattern can easily be switched and the touch button can be displayed or hidden in an easily switchable manner. Therefore, easy switching between a guide not accepting a touch operation and a touch button accepting a touch operation can be achieved, even in a case where the guide and the touch button display identical content. Switching between display and non-display of the touch button enables not only switching between display and non-display of the touch button, such as the Q button, but also switching of the display status of ISO sensitivity or the like in the basic shooting information between a guide and a touch button.

As described, even in a case where the touchable area is limited, switching to guide display enables a user to perform a touch operation of specifying the touch position while viewing a guide in such a state that the touchable range is not narrowed.

In the present exemplary embodiment, a description has been provided assuming that a touch operation is enabled. However, switching (setting of enabling or disabling a touch operation) between enabling of a touch operation (touch enabled state) or disabling of a touch operation (touch lock, touch disabled state), in which case the process according to touch is not performed, can be performed on the menu screen. When a touch operation is disabled, even if a touch operation is performed in the AF range described in S705 in FIG. 7A, AF at the touch position will not be performed, and the touch button will not be displayed (can be displayed as a guide).

It has been described that the process according to a touch operation will not be performed in a case where a touch operation is disabled. However, a touch operation in the AF range can be accepted (touch AF can be performed), and touch shutter may not be accepted.

When a touch operation is disabled so that the process according to a touch operation for the display unit 28 will not be performed, an unwanted operation caused by a touch operation not intended can be prevented. However, operability can be degraded in a case of position setting. For example, by specifying the position of an object by directly touching the position on the LV screen, a user can intuitively specify the AF position and can more quickly specify the position than by specifying the desired position using the operation member, such as the cross key or the dial. Therefore, when a touch operation itself is disabled, user operability, especially in a case of setting the AF position or the like, can be degraded. In view of the above, if settings are configured such that a touch operation itself is enabled and the position can be set through a touch operation, but some of the processes such as a setting change of an item cannot be performed by touching, the likelihood that setting or a process not intended will be performed can be lowered. For example, when a user unintentionally touches the touch button of an item regarding shooting, the set value is changed before the user is aware of it, and an image is captured in that state, and an image not desired by the user is recorded. In view of the foregoing, as described in the above-described exemplary embodiment, if settings are configured such that the set value of the item will not be changed unintentionally, an image is less likely to be captured in a state where the set value not intended is set.

As described, since switching between display or non-display of a touch button (touch switching) can be performed independently of the setting of enabling or disabling a touch operation, settings can be configured such that some touch operations, such as specifying the position, are accepted, but a touch operation, such as changing the set value of an item, is not accepted. At that time, since the display content (set content) of an item is displayed as a guide even though the item is not displayed as an item capable of accepting a touch operation, a user can set the position by touching while confirming the display content of the item. For example, in a case where a user sets the AF position while viewing the ISO sensitivity value and the aperture value, if the touch button itself is hidden in order to prevent an erroneous operation, the user cannot confirm the ISO sensitivity. However, the user can set the AF position while confirming the ISO sensitivity when the ISO sensitivity is displayed as a guide.

In the present exemplary embodiment, the shutter speed, the aperture, and the ISO sensitivity are examples of items each can be displayed as a guide or a touch button in a switchable manner. However, display of a set value of a setting item other than these items can also be switched to display as a touch button. That is, other guides of detailed shooting information and basic shooting information can be switched to touch buttons as long as the setting can be changed. In addition, in the present exemplary embodiment, the basic shooting information is described in a case of a manual mode (M), and a guide indicating exposure compensation located between the touch buttons 808 and 809 in the guide 802 is not displayed as a touch button. However, in a case where display of the touch button is turned ON in the Tv mode or the Av mode, all the items, including exposure compensation, included in the guide 802, can be displayed as touch buttons.

Since the shutter speed, the aperture, and the ISO sensitivity are elements that change exposure of imaging, they are collectively switched between guides and touch buttons. In contrast, since the Q button, the enlargement button, and the touch shutter are elements that do not affect, for example, a specific matter in common, settings can be configured such that only the Q button is displayed or only the enlargement button and the touch shutter are displayed.

In response to detection of a touch operation for a touch button, the display form of the touch button is changed, and in response to detection of a touch operation for a position capable of accepting the AF process, a mark such as a frame is displayed. Since display is performed as described above, a user can find out at a glance whether touch on the touch button is detected or a touch operation for selecting the position where the AF process is performed.

In the above various exemplary embodiments, the operation for specifying the position where the AF process is performed has been described. However, the operation can also be applied to setting (selection) of the position (region) where various processes other than the AF process are performed. For example, the operation can be applied to selection of a face AF frame for focusing on the face of a specific person, selection of the enlarged position (zoom in, zoom out), etc. The operation can also be applied to a case of selecting the object, the position, or the region serving as a reference when a process such as AE or white balance (WB) is performed. In addition, the operation can be applied to non-shooting related processes, such as specifying on the edit screen or the like the position where a color or an effect is applied, specifying a predetermined image or thumbnail from among a plurality of images or thumbnails, etc.

The present exemplary embodiment has described four information display patterns. However, the number of patterns is not limited to four, and can be any applicable number.

The electronic apparatus can be controlled by a single hardware element or can be controlled by a plurality of hardware elements that share processing.

The above-described exemplary embodiments are not seen to be limiting, and various forms within a scope not deviating from the spirit of the exemplary embodiments are applicable. The above-described exemplary embodiments can be combined with each other.

The electronic apparatus in the above-described exemplary embodiments has been described as a being a digital camera. The electronic apparatus is not limited to a digital camera, and any electronic apparatus that can control a touch panel on which a touch position can be specified is applicable. For example, a personal computer (PC), a mobile phone terminal, a portable image viewer, a digital photo frame, a music player, a game console, an electronic book reader, a tablet PC, a smartphone, a projector, a household appliance including a display unit, etc.

Other Embodiments

Exemplary embodiments can also be realized by executing the process for supplying software (program) for realizing the above-described functions to a system or an apparatus via a network or various types of a recording medium, and causing a computer (or a CPU, a MPU, or the like) of the system or the apparatus to read out and execute program codes. In this case, the program, and the recording medium storing the program constitute the exemplary embodiment(s).

Effect

According to the exemplary embodiments, the likelihood that a process, not intended by a user to be performed when a touch operation is performed can be lowered, while enabling a user to confirm information display content.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-245587, filed Dec. 16, 2015, which is hereby incorporated by reference herein in its entirety.

What is claimed is:

1. An electronic apparatus comprising:
one or more processors configured to function as:
an image obtaining unit configured to obtain an image captured by an image sensor;
a switching unit configured to switch a state to one of a plurality of states including a first state and a second state;
a display control unit configured to display information and the image on a display unit in the first state, and display the information and the image on the display unit in the second state; and
a control unit configured, in the first state, in response to a touch operation being performed at a position on the image, to perform a first process corresponding to a position on the image, and in response to a touch operation being performed at the information, to perform a second process corresponding to the information and not to perform the first process, and
configured, in the second state, in response to a touch operation being performed at a position on the image, to perform the first process corresponding to a position on the image, and in response to a touch operation being performed at the information, to perform the first process corresponding to a position in the information where the touch operation has been performed and not to perform the second process, wherein size of an area where the first process is performed in response to the touch operation in the second state is larger than in the first state.

2. The electronic apparatus according to claim 1, wherein the display control unit is configured to change a display form of the information in the first state and in the second state.

3. The electronic apparatus according to claim 1, wherein the second process is a process of changing a setting indicated by the information.

4. The electronic apparatus according to claim 1, wherein if a user touches an image of an object on the display unit, the first process is performed to the object.

5. The electronic apparatus according to claim 4, wherein the first process is at least one of focus change, exposure change, or white balance change.

6. The electronic apparatus according to claim 1, wherein the one or more processors are further configured to function as a touch switching unit configured to perform switching between a touch enabled state where a touch operation for the display unit can be accepted and a touch disabled state where a touch operation for the display unit is not accepted,
wherein the control unit is configured, in a case where switching to the touch disabled state is performed, not to perform the first process even when a touch operation is being performed at a position on the image, and even in the first state, not to perform the second process when a touch operation is being performed at the information.

7. The electronic apparatus according to claim 1, wherein the control unit is configured, in the first state, to display a touch button which is different from the information on the display unit, and not to display the touch button in the second state, and
wherein in response to a touch operation being performed at the touch button, to perform a process corresponding to the touch button.

8. The electronic apparatus according to claim 7, wherein the touch button includes at least a touch button configured to cause a setting screen to be displayed, a touch button configured to cause an image displayed on the display unit to be enlarged, or a touch button configured to perform switching between whether a shooting instruction is accepted through a touch operation.

9. The electronic apparatus according to claim 1, wherein the information includes a shutter speed, an aperture, ISO sensitivity, or exposure compensation.

10. The electronic apparatus according to claim 1, wherein the information is displayed in a position along an edge of the display unit.

11. The electronic apparatus according to claim 1, wherein the switching unit is configured to switch the state to one of the plurality of states including the first state and the second state through an operation of a single operation member provided at a position other than where the display unit is provided.

12. The electronic apparatus according to claim 1, wherein the switching unit is configured to switch a display mode to one of a plurality of display modes different from each other in a number of information displayed indicating set content or an operation state of the electronic apparatus, the plurality of display modes including a first display mode corresponding to the first state, a second display mode corresponding to the second state, and a third display mode.

13. The electronic apparatus according to claim 12, wherein the one or more processors are further configured to function as a setting unit configured to set information to be displayed for each of the plurality of display modes including the first display mode and the second display mode,
wherein the switching unit is configured to switch the display mode to one of the plurality of display modes.

14. The electronic apparatus according to claim 13, wherein the setting unit is configured to set whether the information is displayed in the first state or is displayed in the second state for each of the plurality of display modes.

15. The electronic apparatus according to claim 1, wherein the one or more processors are further configured to function as:
a changing unit configured to change the set value of the information,
wherein the control unit is configured to change a display form of the information in response to a change in the set value of the information.

16. The electronic apparatus according to claim 1, wherein the information shows a setting value of the capturing performed by the image sensor.

17. The electronic apparatus according to claim 1, wherein the information is displayed overlapping the image.

18. The electronic apparatus according to claim 1, wherein a display position of the information is same in the first state and in the second state.

19. The electronic apparatus according to claim 1, wherein a display layout of a plurality of displayed information are same in the first state and in the second state.

20. The electronic apparatus according to claim 1, wherein the second process is a process of displaying a setting screen in which a setting value of the information can be changed.

21. The electronic apparatus according to claim 1, wherein in response to touching up from the information is performed, the second process corresponding to the information is performed in the first state.

22. The electronic apparatus according to claim 1, wherein in response to touching on the information is performed, the first process is performed and the second process is not performed in the second state, and in response to touching on the information is performed, neither the first process nor the second process is performed in the first state.

23. The electronic apparatus according to claim 1, further comprising the image sensor.

24. A control method of an electronic apparatus, the control method comprising:
  obtaining an image captured by an image sensor;
  switching a state to one of a plurality of states including a first state and a second state;
  displaying information and the image on a display unit in the first state and displaying the information and the image on the display unit in the second state; and
  performing, in the first state, in response to a touch operation being performed at a position on the image, a first process corresponding to a position on the image, and in response to a touch operation being performed at the information, a second process corresponding to the information and not performing the first process; and
  performing, in the second state, in response to a touch operation being performed at a position on the image, to perform the first process corresponding to a position on the image, and in response to a touch operation being performed at the information, the first process corresponding to a position in the information where the touch operation has been performed and not performing the second process, wherein size of an area where the first process is performed in response to the touch operation in the second state is larger than in the first state.

25. A non-transitory computer-readable storage medium storing computer-executable instructions for causing a computer to execute a method, the method comprising:
  obtaining an image captured by an image sensor;
  switching a state to one of a plurality of states including a first state and a second state;
  displaying information and the image on a display unit in the first state and displaying the information and the image on the display unit in the second state;
  performing, in the first state, in response to a touch operation being performed at a position on the image, a first process corresponding to a position on the image, and in response to a touch operation being performed at the information, a second process corresponding to the information, and not performing the first process; and
  performing, in the second state, in response to a touch operation being performed at a position on the image, and in response to a touch operation being performed at the information, the first process corresponding to a position in the information where the touch operation has been performed, and not performing the second process, wherein size of an area where the first process is performed in response to the touch operation in the second state is larger than in the first state.

* * * * *